(12) United States Patent
Egler

(10) Patent No.: US 12,521,543 B2
(45) Date of Patent: Jan. 13, 2026

(54) PROCESSES FOR VAD CONTROLLER EXCHANGE AND FIRMWARE UPGRADE WITH UNINTERRUPTED CIRCULATORY SUPPORT

(71) Applicant: Boston Scientific Scimed, Inc., Maple Grove, MN (US)

(72) Inventor: Mark S. Egler, Reading, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 337 days.

(21) Appl. No.: 18/250,649

(22) PCT Filed: Sep. 17, 2021

(86) PCT No.: PCT/US2021/050821
§ 371 (c)(1),
(2) Date: Apr. 26, 2023

(87) PCT Pub. No.: WO2022/093421
PCT Pub. Date: May 5, 2022

(65) Prior Publication Data
US 2023/0414922 A1    Dec. 28, 2023

Related U.S. Application Data

(60) Provisional application No. 63/106,922, filed on Oct. 29, 2020.

(51) Int. Cl.
*A61M 60/178* (2021.01)
*A61M 60/216* (2021.01)
*A61M 60/538* (2021.01)

(52) U.S. Cl.
CPC ........ *A61M 60/178* (2021.01); *A61M 60/216* (2021.01); *A61M 60/538* (2021.01); *A61M 2205/17* (2013.01)

(58) Field of Classification Search
CPC ................................................ A61M 2205/17
See application file for complete search history.

(56) References Cited

U.S. PATENT DOCUMENTS 6,351,048 B1 *   2/2002   Schob ................. F16C 32/0459
                                                          310/68 B
2015/0290376 A1   10/2015  Schade et al.
(Continued)

FOREIGN PATENT DOCUMENTS

WO    2017087380 A1    5/2017

OTHER PUBLICATIONS

Schwartz, Casey M., PhD, "Phase (waves)," published 2019, EBSCO Information Services, https://www.ebsco.com/research-starters/science/phase-waves (Year: 2019).*

(Continued)

*Primary Examiner* — Michael W Kahelin
(74) *Attorney, Agent, or Firm* — Seager Tufte & Wickhem, LLP

(57) ABSTRACT

A method of operating an implantable blood pump including connecting the implantable blood pump to a primary controller, the primary controller being configured to operate the implantable blood pump, and a secondary controller. The secondary controller synchronizes its own motor drive signals to a frequency and phase of the primary controller's motor drive signals, without actively contributing power to the implantable blood pump. An imminent or actual disconnection event is detected in which the primary controller is disconnected from the implantable blood pump. Uninterrupted operation of the implantable blood pump is continued with the secondary controller.

2 Claims, 3 Drawing Sheets

(56) References Cited

U.S. PATENT DOCUMENTS

2015/0290378 A1   10/2015  Schade et al.
2016/0095968 A1    4/2016  Rudser
2018/0256796 A1*  9/2018  Hansen ................ A61M 60/88
2019/0134286 A1*  5/2019  Johnson .............. A61M 60/592

OTHER PUBLICATIONS

International Preliminary Report on Patentability from International Application No. PCT/US2021/050821 dated May 2, 2023, 11 pp.
International Search Report and Written Opinion of International Application No. PCT/US2021/050821 dated May 5, 2022, 17 pp.

\* cited by examiner

PROCESSES FOR VAD CONTROLLER EXCHANGE AND FIRMWARE UPGRADE WITH UNINTERRUPTED CIRCULATORY SUPPORT

This application is a U.S. National Stage entry under 35 U.S.C. § 371 of International Application No. PCT/US2021/050821, filed Sep. 17, 2021, which claims priority from and the benefit of U.S. Provisional Patent Application No. 63/106,922, filed on Oct. 29, 2020, the entire content of each of which is incorporated herein by reference.

FIELD

The present technology is generally related to software upgrades for controllers for implantable blood pumps, and in particular, replacement or upgrade of controllers for implantable blood pumps.

BACKGROUND

A ventricular assist device (VAD) controller that is operating to run an implantable VAD may need to be replaced or have its software upgraded, owing to possible device malfunction or other reasons, and the VAD controller may need to be disconnected from the VAD resulting in temporary interruption of blood circulation support. Additionally, VAD controllers may need to be replaced over time.

SUMMARY

The techniques of this disclosure generally relate to replacement or software upgrades of controllers for implantable blood pumps.

In one aspect, a method of operating an implantable blood pump includes connecting the implantable blood pump to a primary controller, the primary controller being configured to operate the implantable blood pump, and a secondary controller. The secondary controller synchronizes its own motor drive signals to a frequency and phase of the primary controller's motor drive signals, without actively contributing power to the implantable blood pump. An imminent or actual disconnection event is detected in which the primary controller is disconnected from the implantable blood pump. Uninterrupted operation of the implantable blood pump is continued with the secondary controller.

In another aspect of this embodiment, operating the implantable blood pump with the secondary controller includes operating the implantable blood pump at a same impeller rotation speed to that of the primary controller.

In another aspect of this embodiment, the disconnection event is a signal from the primary controller to the secondary controller indicating an imminent disconnection of the primary controller.

In another aspect of this embodiment, the primary controller and the secondary controllers are substantially identical controllers.

In another aspect of this embodiment, the primary controller and the secondary controller are physically connected to the blood pump.

In one aspect, a control system for an implantable blood pump includes a primary controller in communication with the implantable blood pump. A secondary controller is in communication with the implantable blood pump. The secondary controller has processing circuitry configured to: synchronize with a frequency and phase of motor drive signals from the primary controller; detect an imminent or actual disconnection event in which the primary controller is disconnected from the implantable blood pump; and maintain operation of the implantable blood pump when the primary controller is disconnected from the implantable blood pump.

In another aspect of this embodiment, operating the implantable blood pump includes operating the implantable blood pump at a same impeller rotation speed to that of the primary controller.

In another aspect of this embodiment, the primary controller and the secondary controller are physically connected to the implantable blood pump.

In another aspect of this embodiment, the disconnection event is a signal from the primary controller to the secondary controller indicating an imminent disconnection of the primary controller.

In another aspect of this embodiment, the primary controller and the secondary controller are substantially identical controllers.

In one aspect, a method of upgrading software of a controller for an implantable blood pump from current software to upgraded software includes transferring the upgraded software into a section of program memory of the controller while continuing to operate the implantable blood pump with current software in a different section of program memory than the upgraded software. Operation of the implantable blood pump is transferred from the current software to the upgraded software, the upgraded software being configured to determine a frequency and phase of motor signals from the implantable blood pump. Uninterrupted operation of the implantable blood pump is continued with the upgraded software.

In another aspect of this embodiment, during the transferring of the operation of the implantable blood pump the speed of the impeller of the implantable blood pump is passively reduced to a reduced speed, and wherein the method further includes increasing a speed of the implantable blood pump to a set speed from the reduced speed during a predetermined amount of time.

In another aspect of this embodiment, the current software increases the speed of the impeller of the implantable blood pump by a predetermined amount before transferring operation of the implantable blood pump to the upgraded software.

In another aspect of this embodiment, the current software stores information related to impeller speed in memory to aid the upgraded software in determining the frequency and phase of the motor signals from the implantable blood pump.

In one aspect, a controller for an implantable blood pump includes processing circuitry configured to: transfer the upgraded software into a section of program memory of the controller while continuing to operate the implantable blood pump with current software in a different section of program member than the upgraded software; transfer operation of the implantable blood pump from the current software to the upgraded software, the upgraded software being configured to determine a frequency and phase of motor drive signals from the implantable blood pump; and continue uninterrupted operation of the implantable blood pump with the upgraded software.

In another aspect of this embodiment, during the transfer of the operation of the implantable blood pump the speed of the impeller of the implantable blood pump is passively reduced to a reduced speed, and wherein the processing circuitry is further configured to increase a speed of the implantable blood pump to a set speed from the reduced speed during a predetermined amount of time.

In another aspect of this embodiment, the current software is configured to increase the speed of the impeller of the implantable blood pump by a predetermined amount before transferring operation of the implantable blood pump to the upgraded software.

In another aspect of this embodiment, the current software is configured to store information related to impeller speed in memory to aid the upgraded software in determining the frequency and phase of the motor signals from the implantable blood pump.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, firmware, software, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structures or any other physical structure suitable for implementation of the described techniques. Also, the techniques could be fully implemented in one or more circuits or logic elements.

Figure 1:
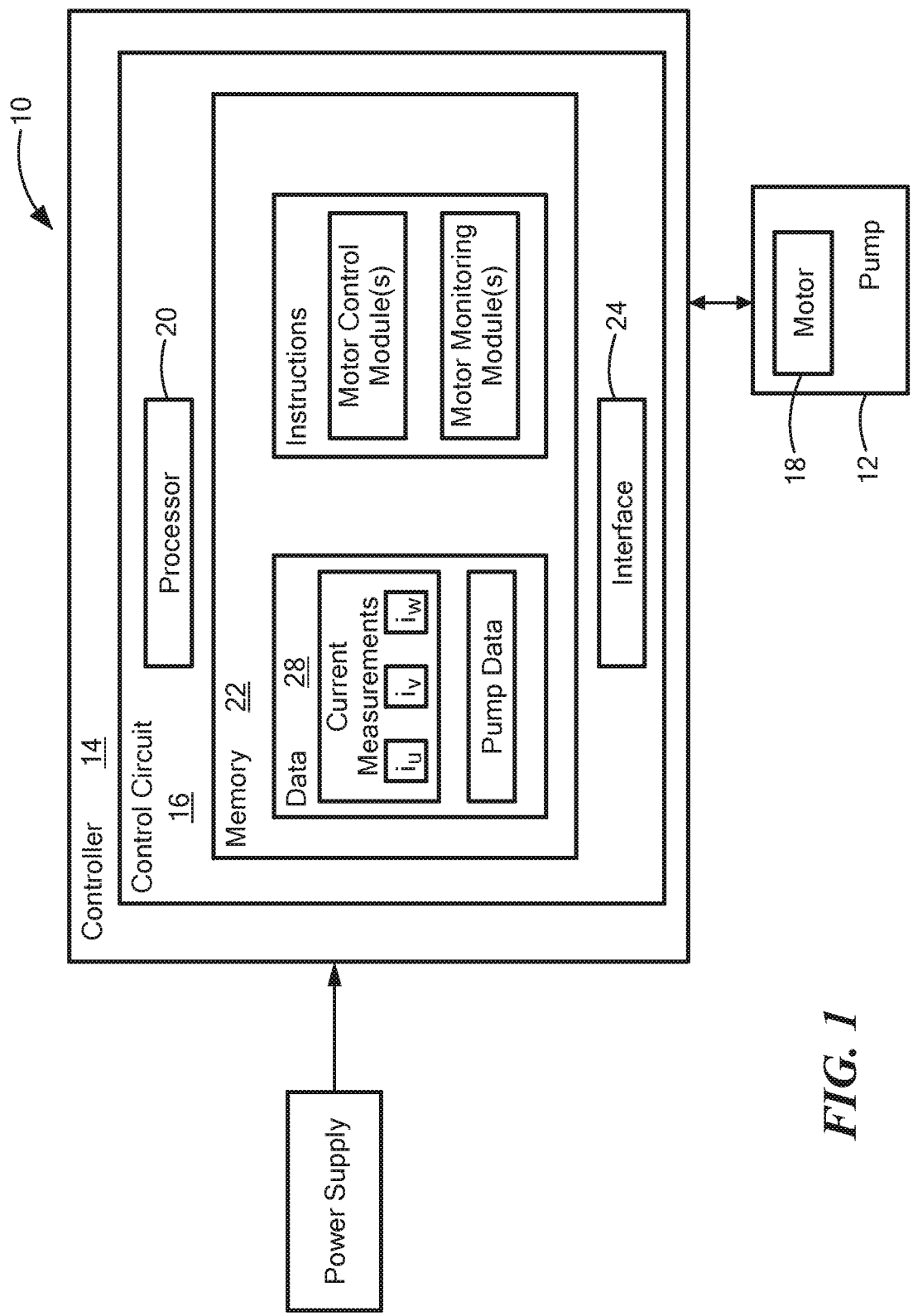
FIG. 1 is a block diagram of an exemplary system for an exemplary implantable blood pump.

FIG. 1 is a block diagram of the system 10 including an implantable blood pump 12 in communication with a primary controller 14. The blood pump 12 may be the HVAD® Pump or another mechanical circulatory support device fully or partially implanted within the patient and having a movable element, such as a rotor, configured to pump blood from the heart to the rest of the body. The primary controller 14 includes a control circuit 16 for monitoring and controlling startup and subsequent operation of a motor 18 implanted within the blood pump 12. The primary controller 14 may also include a processor 20, a memory 22, and an interface 24. The memory 22 is configured to store information accessible by the processor 20 including instructions 26 executable by the processor 20 and/or data 28 that may be retrieved, manipulated, and/or stored by the processor 20. In particular, the processor 20 includes circuitry configured to carry out the steps discussed herein with respect to the methods. As such, reference to the system 10 executing steps of the methods is intended to include the processor 20.

Figure 2:
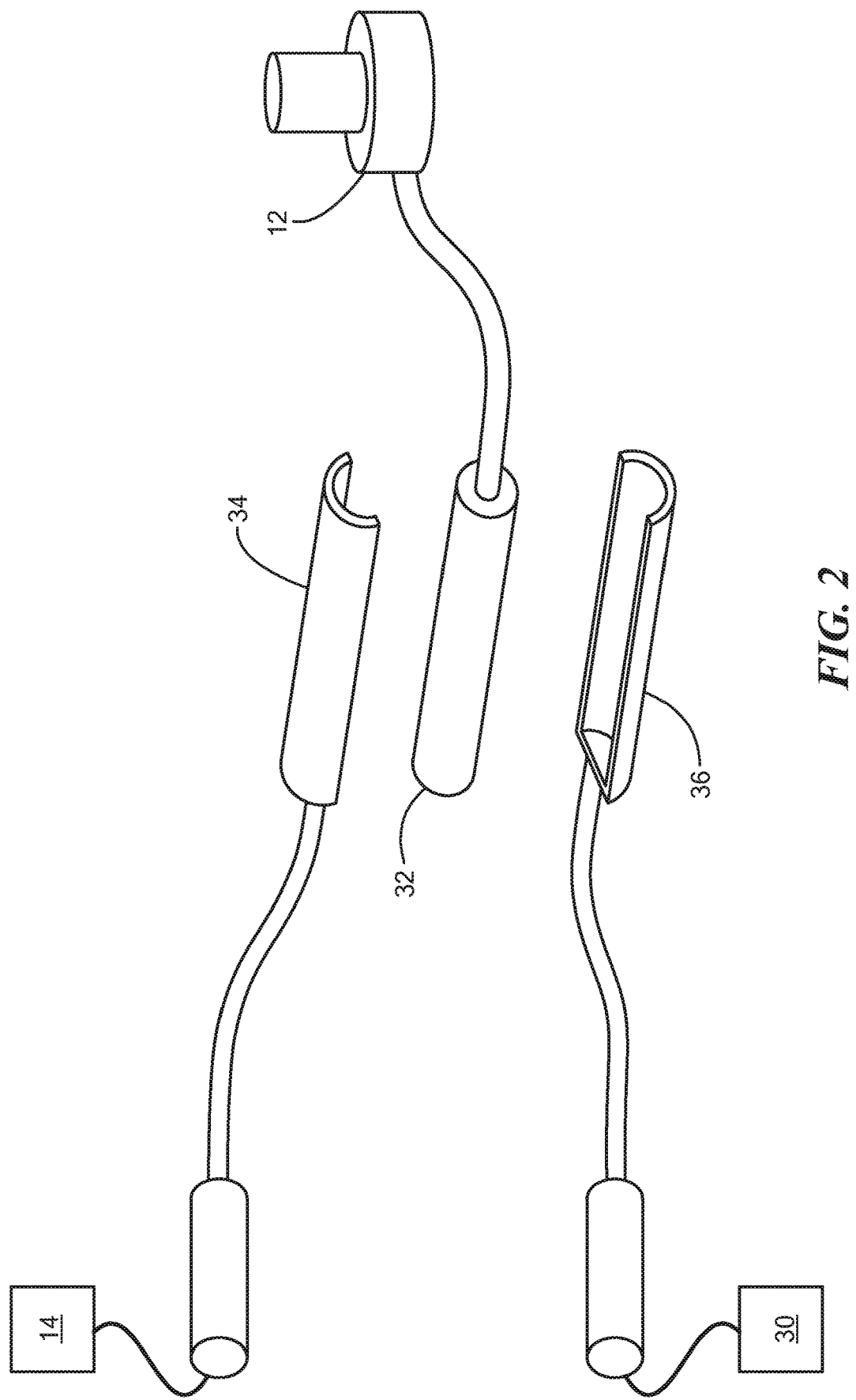
FIG. 2 is a schematic of a junction connector configured to couple with connectors for a primary controller and a secondary controller of the implantable blood pump.

Referring now to FIG. 2, a secondary controller 30 may be coupled to the primary controller 14 and in communication with the implantable blood pump 12. In one configuration, a common junction connector 32 may be utilized to couple both the primary controller 14 and the secondary controller 30 together. For example, as shown in FIG. 2, the junction connection may be cylindrical in shape and configured to engage with a first connector 34 of the primary controller 14, which defines a semi-cylindrical shape, and a second connector 36 of the secondary controller 30, which also defines a semi-cylindrical shape. Although shown as cylindrical or semi-cylindrical, the shape of the connectors 34 and 36 as well as that of the junction connector 32 may vary. The junction connection 32 may include electrical contacts on its outer surface configured to engage with corresponding electrical contacts on the inner surface of the connectors 34 and 36. In one configuration, the connectors 34 and 36 are snap-fit or magnetically coupled onto opposite sides of the junction connector 32. In other configurations, the connectors and 34 and 36 may include a set screw such that they can be screwed into a corresponding threaded opening on the junction connector 32. One advantage of this configuration is that junction connector 32 may be proximate to the patient's driveline exit location that if cable damage occurs to the section between the junction connector 32 and the controller 14, a new cable could be attached, along with the secondary controller 30, allowing the damaged cable to be replaced without stopping the pump 12. In still other configurations, the junction connector 32 is Y-shaped or T-shape. For example, when the junction connector 32 is T-shape, the first connector 34 may connect with a first end of the arm of "T" and the second connector 36 may engage with a second end of the arm of the "T." The elongate section of the "T" junction connector 32 may fold toward the arm such that it is parallel with the arm of the "T." In such a configuration, the junction connector 32 has a low profile.

In one configuration, the primary controller 14 and the secondary controller 30 function the same way. That is the secondary controller 30 may have the same configuration, i.e., is substantially identical and operates the same way as the primary controller 14 to operate the implantable blood pump 12. In one configuration, the user carries the primary controller 14, for example, on a waist belt and the clinician connects the secondary controller 30 while the primary controller 14 operates the implantable blood pump 12 implanted within the user. In an exemplary configuration, both the primary controller 14 and the secondary controller 30 are physically and electrically connected to the implanted blood pump 12. For example, a parallel connection may be made with the one or more of the conductors from the pump 12 with both the primary and secondary controllers.

Figure 3:
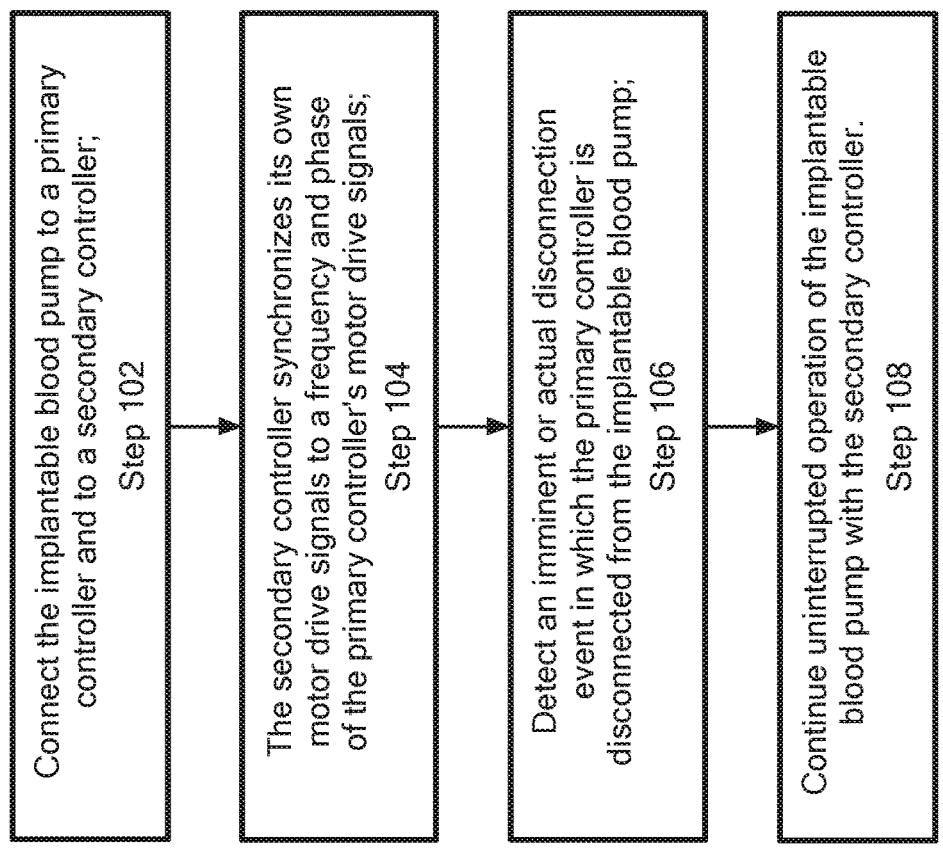
FIG. 3 is a flow chart showing a method of operating the implantable blood pump with a primary controller and secondary controller.

Referring now to FIG. 3, where a method of operating an implantable blood pump is shown. The implantable blood pump is connected to a primary controller, the primary controller being configured to operate the implantable blood pump 12, and the secondary controller 30, as discussed above. (Step 102). The secondary controller 30 is configured to synchronize its own motor drive signals to a frequency and phase of the primary controller's motor drive signals, without actively contributing power to the implantable blood pump 12 (Step 104). That is, the secondary controller 30 mimics the frequency and phase of the primary controller's motor drive signals as if the secondary controller 30 were operating the pump 12. The secondary controller 30 is configured to detecting an imminent or actual disconnection event in which the primary controller 14 is disconnected from the implantable blood pump 12 (Step 106). For example, the primary controller 14 may send a signal, which may be sent, for example, 100 ms before the primary controller 14 stops driving the pump, to the secondary controller 30 indicating that the primary controller 14 will stop driving the pump 12 after a predetermined and precisely timed interval, allowing the secondary controller 30 to begin driving the pump 12 with no interruption or after a very short period while the pump 12 is not being driven but remains running. The primary controller 14 could then be disconnected at any later time. Alternatively, the primary controller 14 is disconnected from the pump 12 by disconnecting the driveline of the pump from the primary controller 14 and the secondary controller 30 detects that actual disconnection event within a short period and immediately begins to drive the pump 12 in response.

Once the imminent or actual disconnection event is determined by the secondary controller 30, the operation of the implantable blood pump 12 is assumed by the secondary controller 30 to provide for continuous uninterrupted operation of the implantable blood pump 12 (Step 108). That is, the secondary controller 30 operates the implantable blood pump 12 at the same impeller speed to that of the primary controller 14 before the imminent or actual disconnection event. In such a transition, the patient does not lose blood flow support.

Figure 4:
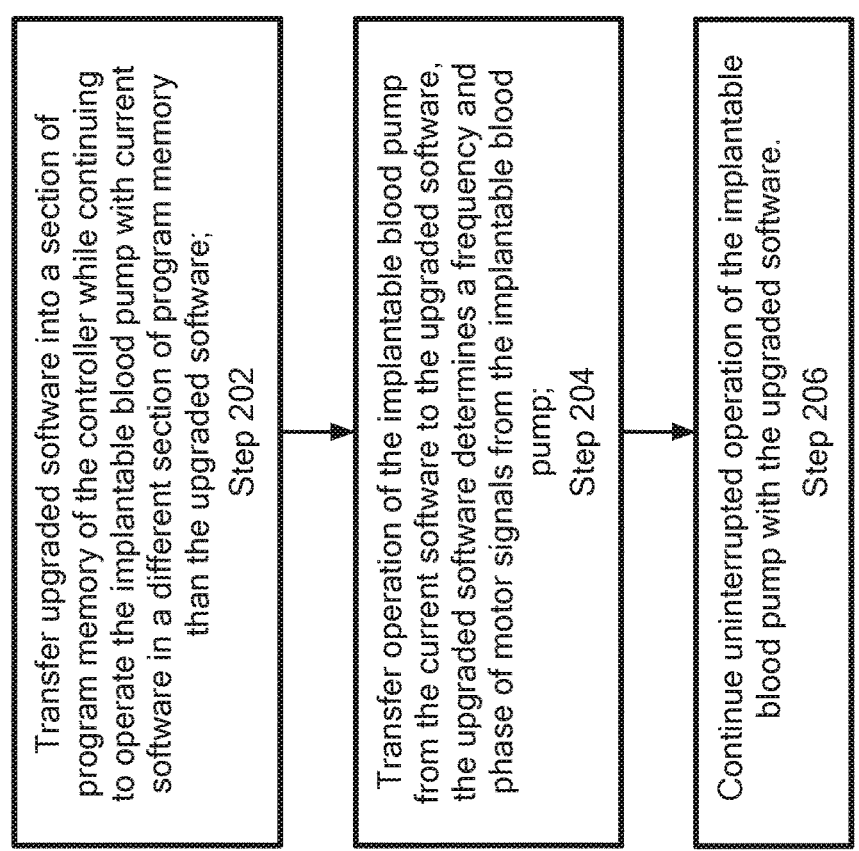
FIG. 4 is a flow chart showing a method of upgrading software of the controller for the implantable blood pump.

Referring now to FIG. 4, in another configuration, a method of upgrading software of a controller 14 for an implantable blood pump 12 from current software to upgraded software includes transferring the upgraded software into a section of program memory of the controller while continuing to operate the implantable blood pump with current software in a different section of program memory than the upgraded software (Step 202). For example, the firmware which controls less critical functions of the blood pump may be required to be upgraded. The current firmware on the controller 14 controls functions such as impeller rotation. However, during an upgrade, operation of the implantable blood pump is transferred from the current software to the upgraded software (Step 204). The upgraded software is configured to determine a frequency and phase of motor signals from the implantable blood pump such that when operation of the implantable blood pump is transferred to the upgraded software, operation of the implantable blood pump is uninterrupted and continued with the upgraded software (Step 206). In one configuration, during the transfer of the operation of the implantable blood pump the speed of the impeller of the implantable blood pump 12 is passively reduced to a reduced speed by the current software. The upgraded software is configured to increase the speed of the implantable blood pump to a set speed of the implantable blood pump 12 from the reduced speed during a predetermined amount of time. For example, the transfer between the current software and the upgraded software may be rapid to avoid a stoppage in operation of the blood pump 12. In one configuration, the upgraded software increases the speed of the implantable blood pump from the reduced speed to the set speed from in between 10 to 90 milliseconds. In one configuration, the current software increases the speed of the impeller of the implantable blood pump 12 by a predetermined amount before transferring operation of the implantable blood pump 12 to the upgraded software. In particular, in anticipation of the transfer to the upgraded software and therefore a reduction in speed of the impeller of the implantable blood pump, the current software increases a speed of the impeller of the blood pump 12. Moreover, the current software stores information related to impeller speed in memory to aid the upgraded software in determining the frequency and phase of the motor signals from the implantable blood pump 12 for transfer to the upgraded software.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A controller for an implantable blood pump, the controller comprising:
a memory; and
processing circuitry configured to:
transfer upgraded software into a section of the memory while continuing to operate the implantable blood pump with current software in a different section of the memory than the upgraded software;
transfer operation of the implantable blood pump from the current software to the upgraded software, the upgraded software being configured to determine a frequency and phase of motor drive signals from the implantable blood pump;
continue uninterrupted operation of the implantable blood pump with the upgraded software; and,
wherein during the transferring of the operation of the implantable blood pump, the speed of the impeller of the implantable blood pump is passively reduced to a reduced speed, and wherein the processing circuitry is further configured to increase the speed of the impeller to a set speed from the reduced speed during a predetermined amount of time.

2. A controller for an implantable blood pump, the controller comprising:
a memory; and
processing circuitry configured to:
transfer upgraded software into a section of the memory while continuing to operate the implantable blood pump with current software in a different section of the memory than the upgraded software;

transfer operation of the implantable blood pump from the current software to the upgraded software, the upgraded software being configured to determine a frequency and phase of motor drive signals from the implantable blood pump;

continue uninterrupted operation of the implantable blood pump with the upgraded software; and wherein the current software increases the speed of the impeller of the implantable blood pump by a predetermined amount before transferring operation of the implantable blood pump to the upgraded software.

* * * * *